United States Patent Office 3,160,600
Patented Dec. 8, 1964

3,160,600
METHOD FOR INCORPORATING COLORANTS IN MOLTEN POLYAMIDES USING ADIPONITRILE AS DISPERSING AGENT
John R. Holsten and James S. Tapp, Raleigh, N.C., assignors, by mesne assignments, to Monsanto Company, a corporation of Delaware
No Drawing. Filed Mar. 13, 1961, Ser. No. 94,976
2 Claims. (Cl. 260—37)

The present invention relates to an improved method for uniformly incorporating pigments in molten synthetic linear polyamides. The synthetic linear polyamides with which this invention is concerned are of the general types as described in U.S. Patents 2,071,250, 2,071,253 and 2,130,948. These polymeric substances are generally known as and commonly referred to as nylon.

The afore-noted polymeric substances are characterized by the presence of recurring carbonamide groups as an integral part of the polymer chain, which groups are separated by at least two carbon atoms. They are further characterized by a micro-crystalline rather than a resinous structure, and they possess sharp melting points.

The synthetic linear polyamides are of two general types, those which are obtained from the self-polymerization of amino acids such as 6-aminocaproic acid, 9-aminonoanoic acid, 11-aminoundecanoic acid and their amide-forming derivatives, for example, epsilon-caprolactam; and those which are formed by the condensation of a diamine with a dibasic acid or an amide-forming derivative thereof. Various diamine and dibasic acid combinations which are commonly employed in the latter type preparation are hexamethylenediamine and adipic acid, hexamethylenediamine and suberic acid, hexamethylenediamine and sebacic acid, octamethylenediamine and adipic acid, octamethylenediamine and sebacic acid, among others. In the formation of copolymers various proportions of two or more dibasic acids, diamines and amino acids may be employed. Upon hydrolysis with strong mineral acids these polymers yield the reactants from which they were formed.

Probably the most useful of the synthetic linear polyamides are those of the higher molecular weights, i.e., in excess of 10,000. They excel in toughness and durability and are capable of being formed into filaments which can be cold drawn with permanent and high linear extensions to yield fibers having a molecular orientation along the fiber axis. Lower molecular weight polyamides are also widely used in the preparation of such products as firms, bristles, rods, tubes, other shaped articles, coatings and the like.

The high molecular weight required for the best filament or fiber-forming properties is obtained during the manufacture of the polyamide by continuing the polymerization reaction until the intrinsic viscosity of the reaction product is at least 0.4. Intrinsic viscosity of the synthetic linear condensation polymers is defined as $$\frac{\log_e \eta r}{C}$$

in which $\eta r$ is the viscosity of a dilute solution (e.g. 0.5 percent) of the linear polymer in a suitable solvent, such as a meta-cresol, divided by the viscosity of the solvent at the same conditions, and C is the concentration in grams per 100 ml. of solution.

This invention is concerned with and applicable to both the fiber-forming polyamides having an intrinsic viscosity in excess of 0.4 and the lower molecular weight polymers having intrinsic viscosities in the range of from about 0.1 to about 0.4.

Because many of the products formed from synthetic linear polyamides require coloration for commercial acceptability, improved methods for imparting color thereto are constantly being sought. In connection with this effort, a great deal of attention has been given to the possibility of adding color to the polymer prior to the formation of the various products such as fibers, films, etc. therefrom. This concept is a departure from the conventional practice of applying colorants, such as dyes, pigments and the like to the ultimate end product. An ability to impart color to the polymer during processing would, of course, have the inherent advantages of convenience, economy and an improved fastness of color. However, despite these obvious advantages, a wholly satisfactory method for attaining this objective has not yet been provided, although there have been a number of suggested techniques.

One method proposed heretofore is to mix the desired pigment with the monomeric reactants employed to form the polyamide so that the pigment is present during the condensation reaction and remains in the polymer eventually produced. A suggested improvement on this method is to introduce the desired pigment into the reaction mass at some stage after condensation has begun but before the polymerized mass has become too viscous to provide adequate mixing. A still further improvement has been advanced wherein it is proposed that the condensation reaction be conducted in the presence of a mixture of water, finely divided pigment and protective colloids. However, this general proposal and the variations thereof have all proven to be impractical and incapable of achieving satisfactory results. One of the major difficulties has been an inability to attain a uniform distribution of pigment in the polymer. Furthermore, from the practical point of view, it is not feasible to introduce pigment into polymerization autoclaves, since the commercial production of synthetic linear polyamides is carried out in very large equipment that cannot be easily cleaned to avoid contamination every time a color change is made. Moreover, the necessity for frequent cleanings would inevitably cause intolerable sacrifices in production.

Another suggested procedure has been to coat polyamide flake with the desired pigments, melt the coated flakes, and thereafter extrude the molten polymer into the desired article. This proposal has not proven satisfactory in practice either because of an inability to obtain a uniform coating on the flake with a consequent unevenness of color in the extruded product.

It has been proposed further that the pigmenting agents be uniformly distributed and suspended in a suitable medium and that this suspension then be introduced directly into molten polyamide. That is, the suggestion contemplates the intermixture of the pigment suspension with the polyamide melt just prior to extrusion. A workable procedure of this general type would overcome some of the serious defects of those suggestions noted hereinabove. To illustrate, there would be little interference with normal production operations, since the need to periodically remove colorants from large scale production autoclaves would be eliminated. Moreover, the suggestion offers greater possibilities for the attainment of even and uniform coloration of the ultimate product.

Although the just described proposal for building color into polyamide filaments and other extruded articles presents practical possibilities, it also presents inherent problems of a formidable nature which have not been solved heretofore to permit commercial practice. Foremost of these problems has been an inability to obtain a suitable dispersing medium. Any dispersing vehicle to be acceptable must be colorless and compatible with the polymer, it must have a boiling point at atmospheric pressure above the temperatures employed in the extrusion or spinning of polyamides, it must not adversely affect the physical or chemical properties of extruded products, such as filaments and fibers. Finally, the dispersing medium must be capable of maintaining finely divided pigment in a highly dispersed and uniformly distributed condition over substantial periods of time and under polymer processing conditions. This is a prime requisite if even and uniform coloration is to be attained in the extruded product. In the case of filament formation there is a further reason for not being able to tolerate pigment agglomeration in that agglomerated pigment tends to foul filter packs resulting in a roughness of the extruded product.

A dispersing vehicle capable of meeting the foregoing numerous and rigorous demands has not been known to the art heretofore, and it is largely for this reason that the proposal for adding colorants to the polyamide melt has failed to materialize into a practical operation.

It is, therefore, a principal object of this invention to provide a method for introducing colorants into synthetic linear polyamides in a more economical, practical and satisfactory manner than has been available hitherto.

It is another object of this invention to provide a new method for evenly dispersing pigments in molten polyamide which does not interfere with normal production procedures.

It is a still further object of this invention to provide a fluid dispersion of pigment which can be metered and pumped directly into the molten polyamide feed line a short distance upstream from the spinnerette in the manufacture of colored filaments and fibers.

Other objects and advantages of this invention will become apparent as the following description thereof proceeds.

It has now been found that finely divided pigment can be uniformly and thoroughly dispersed in a synthetic linear polyamide by intermixing the polyamide in the molten state with a composition which contains the pigment suspended in adiponitrile. By the term "finely divided" as applied with reference to pigment particles, there is meant a degree of subdivision in the order of 5 microns or less.

The admixture of the pigment dispersion with molten polyamide can be made in several ways. For example, the pigment-adiponitrile composition can be simply introduced into a vessel containing polyamide and mixed therewith by mechanical agitation. This can follow immediately after a batch or continuous polycondensation process which would eliminate the necessity for a remelting before extrusion. In the case of filament manufacture, a highly preferred method of admixture is to meter and pump the pigment containing dispersion into the molten nylon feed line a short distance upstream from the spinnerette where the merging streams would be mixed by mechanical agitation. This technique can be carried out with conventional liquid meter pumps and agitators and could be easily combined with a continuous polyamide polymerization process. This procedure has the advantage of permitting convenient and rapid color changes. Furthermore, the danger of color contamination would be lessened by minimizing the exposure of processing equipment to colorants. Mixing in the molten state by whatever method employed may be carried out at atmospheric pressure or at an elevated pressure. However, in all instances, it is essential to work in an inert atmosphere.

The excellent results realized in the practice of this invention are brought about largely as a result of certain surprising properties of adiponitrile which make this material eminently and uniquely suited for the purposes of this invention. For example, it is indeed surprising that a polar compound such as adiponitrile could be used to great advantage as a dispersing agent. Moreover, unlike most conventional pigment vehicles or carriers, adiponitrile can be readily and uniformly dispersed in molten polyamide. It has the further advantages of being colorless, completely compatible with polyamide polymer together with a capability for remaining in the liquid state under the extreme temperature conditions at which polyamides are melt spun or extruded. Adiponitrile is a well known compound having a wide use as an intermediate in the manufacture of hexamethylenediamine, a monomer commonly employed in nylon production. It can be readily synthesized by reacting the vapors of ammonia and adipic acid. These compounds when brought together at the proper temperatures over a fixed-bed dehydration catalysts form diammonium adipate which then gives up water to form adiponitrile.

This invention contemplates the use of any pigment either organic or inorganic that is capable of withstanding the chemical and thermal environment of molten polyamide in an inert atmosphere. For example, the pigment must be capable of maintaining color stability at temperatures in the range of 225° C. to 297° C. Among a number of pigments known to be capable of tolerating these conditions are carbon black, cadmium sulfide, cadmium selenide, Phthalocyanine Green (CI Pigment Green 7; CI 74260), and Phthalocyanine Blue (CI Pigment Blue 15; CI 74610).

The adiponitrile-pigment suspensions which are employed in the practice of this invention can be prepared by several methods. The method of choice is to "flush" a commercial pigment press cake with adiponitrile to form the desired dispersion. In processing commercial pigments they are often worked into an aqueous suspension, which is pressed into a paste-like cake containing from about 20 to 25 percent of pigment solids. This cake may be placed in an appropriate container provided with an inlet conduit at the bottom thereof and a fluid outlet conduit in the upper portion of the container. The pigment cake is "flushed" with adiponitrile by forcing this compound under pressure through the inlet conduit, which in turn forces the aqueous suspending medium from the pigment cake and out of the container through the outlet conduit provided. Thus, adiponitrile which is immiscible with water replaces the same as the suspending medium, and a highly satisfactory dispersion of the pigment in adiponitrile results.

An alternative method is to dry the pigment by removing all traces of water. This is necessary since the presence of water in molten nylon would cause serious production problems. The dried pigment can then be added directly to adiponitrile and thoroughly mixed therewith.

The pigment suspensions for use in the practice of this invention may vary in solids. That is, the suspensions may contain from about 20 to 50 parts by weight of pigment and from about 50 to 80 parts by weight of adiponitrile. Obviously, the higher concentrations of pigment are preferred, but it is not advisable to have a solids content much beyond 50 percent in that it is difficult to keep the resulting paste in a fluid condition.

The amount of pigment-adiponitrile composition which is admixed with the molten polyamide can vary widely depending upon the relative concentration of the pigment in the composition and the intensity of color desired in the ultimate product. Normally, there is employed an amount of from about 1 to 5 percent by weight based on the polyamide to be pigmented with from about 1 to about 2 percent by weight being preferred.

The following specific application of our invention will illustrate the practice thereof in greater particularity.

Into a vessel containing 100 grams of re-distilled adiponitrile there was introduced 30 grams of dry Phthalocyanine Blue Pigment (CI Pigment Blue, CI 74610). The mixture was stirred briskly until thorough intermixture had been attained. The resulting dispersion was then permitted to stand for a period of 5 days during which there was no evidence of a tendency for the dispersion to break. This dispersion was then added to a vessel containing molten polyamide formed from adipic acid and hexamethylenediamine and of a molecular weight in the fiber-forming range. The mixture was thoroughly agitated to obtain good mixing and the resulting mixture was maintained at a temperature of 296° C. for a period of 30 minutes under an inert atmosphere. The plug formed after cooling was a clear and brilliant blue with the pigment well dispersed and of uniform coloration.

Upon melt spinning a colored molten synthetic linear polyamide, such as that described above, but differing only in that Phthalocyanine Green pigment (CI Pigment Green 7; CI 74260) was employed to color the melt, fibers were obtained which showed clear, brilliant and uniform coloration throughout and gave good physical properties after being drawn.

Although the emphasis throughout the preceding description of this invention has been devoted in large measure to the preparation of pigmented fibers for reasons of simplification and because of the commercial importance of fibers, it is by no means so limited in application. As is well known, many other articles are prepared from synthetic linear polyamides which require coloration, such as ribbons, bristles, foils, sheets, films and molded objects. The methods of this invention are equally applicable in these and other instances.

Previous to this invention, the inherent advantages of incorporating color during polymer processing at a point prior to the formation of the end-use product were fully appreciated, and considerable effort had been devoted to effect a workable procedure for accomplishing this. However, as has been pointed out, previous efforts and proposals have not proved to be practical for a variety of reasons which have been noted. The present invention advances the art to the extent that colorants can now be incorporated into molten polyamide with convenience, economy and generally excellent results.

As many variations within the spirit and scope of this invention will readily occur to those skilled in the art to which the invention pertains, it is to be understood that the present invention is not to be limited by specific descriptions and embodiments contained herein but only by the metes and bounds set forth in the appended claims.

We claim:
1. A method for incorporating finely divided pigment in molten synthetic linear polyamide of a molecular weight in the fiber-forming range which comprises mixing said molten synthetic linear polyamide of a molecular weight in the fiber-forming range with from about 1 to 5 percent by weight based on the polyamide of a composition comprising from about 20 to about 50 parts by weight of finely divided pigment having color stability at temperatures in the range of 225° C. to 297° C. dispersed in about 50 to about 80 parts by weight of adiponitrile.

2. A method for incorporating finely divided pigment in molten synthetic linear polyamide of a molecular weight in the fiber-forming range which comprises mixing said molten fiber-forming polyamide with from about 1 to about 2 percent by weight based on the said polyamide of a composition comprising from about 20 to about 50 parts by weight of finely divided pigment having color stability at temperatures in the range of 225° C. to 297° C. dispersed in from about 50 to about 80 parts by weight of adiponitrile.

References Cited in the file of this patent

UNITED STATES PATENTS

| 2,205,722 | Graves | June 25, 1940 |
| 2,245,129 | Greenwalt | June 10, 1941 |
| 2,824,780 | Satterthwaite | Feb. 25, 1958 |
| 2,849,414 | Stoot | Aug. 26, 1958 |

FOREIGN PATENTS

| 569,170 | Great Britain | May 10, 1945 |

OTHER REFERENCES

Zuhr. Obschei Khim. 25, 2127-32 (1955), by Zil'berman. See Chemical Abstracts vol. 50, Col. 8458g (1956).